United States Patent
Mitani et al.

(10) Patent No.: US 10,890,899 B2
(45) Date of Patent: Jan. 12, 2021

(54) METHOD OF SEMICONDUCTOR MANUFACTURING APPARATUS AND NON-TRANSITORY COMPUTER-READABLE STORAGE MEDIUM STORING A PROGRAM OF CAUSING COMPUTER TO EXECUTE DESIGN METHOD OF SEMICONDUCTOR MANUFACTURING APPARATUS

(71) Applicant: Ebara Corporation, Tokyo (JP)

(72) Inventors: Ryuichiro Mitani, Tokyo (JP);
Mitsunori Sugiyama, Tokyo (JP);
Akihiko Ogawa, Tokyo (JP)

(73) Assignee: Ebara Corporation, Tokyo (JP)

( * ) Notice: Subject to any disclaimer, the term of this patent is extended or adjusted under 35 U.S.C. 154(b) by 128 days.

(21) Appl. No.: 16/207,678

(22) Filed: Dec. 3, 2018

(65) Prior Publication Data

US 2019/0171193 A1 Jun. 6, 2019

(30) Foreign Application Priority Data

Dec. 6, 2017 (JP) ................ 2017-234267

(51) Int. Cl.
*G05B 19/418* (2006.01)
*G06F 30/30* (2020.01)
*G06F 119/18* (2020.01)

(52) U.S. Cl.
CPC ....... *G05B 19/41835* (2013.01); *G06F 30/30* (2020.01); *G05B 2219/45031* (2013.01); *G05B 2219/45199* (2013.01); *G06F 2119/18* (2020.01)

(58) Field of Classification Search
CPC .... G05B 19/41835; G05B 2219/45031; G05B 2219/45199; G06F 17/5045; G06F 2119/18; G06F 2217/12; G06F 30/00; G06F 30/30

USPC ......................................................... 700/105
See application file for complete search history.

(56) References Cited

U.S. PATENT DOCUMENTS

| 9,645,572 | B2 * | 5/2017 | Telljohann | G05B 19/4185 |
| 2004/0143830 | A1 * | 7/2004 | Gupton | G06F 8/61 |
| 2006/0105678 | A1 * | 5/2006 | Kohama | B24B 37/04 |
| 2015/0258654 | A1 * | 3/2015 | Shinozaki | B24B 49/105 |

FOREIGN PATENT DOCUMENTS

JP 2005-011977 A 1/2005

* cited by examiner

*Primary Examiner* — Chun Cao
(74) *Attorney, Agent, or Firm* — Leydig, Voit & Mayer, Ltd.

(57) ABSTRACT

A design method of a semiconductor manufacturing apparatus which can satisfy a specification required by a user is disclosed. The design method of the semiconductor manufacturing apparatus includes creating a program setting file; creating a program installer from the program setting file; operating a processing unit of the semiconductor manufacturing apparatus; specifying a sensor corresponding to the processing unit based on the operation of the processing unit; creating a sensor setting file storing information obtained by specifying the sensor; comparing a content of a requirement specification and a content of the sensor setting file to confirm a consistency between the content of the requirement specification and the content of the sensor setting file; and introducing a program into a memory of a controller by the program installer when the content of the requirement specification and the content of the sensor setting file are consistent with each other.

8 Claims, 13 Drawing Sheets

US 10,890,899 B2

METHOD OF SEMICONDUCTOR MANUFACTURING APPARATUS AND NON-TRANSITORY COMPUTER-READABLE STORAGE MEDIUM STORING A PROGRAM OF CAUSING COMPUTER TO EXECUTE DESIGN METHOD OF SEMICONDUCTOR MANUFACTURING APPARATUS

CROSS REFERENCE TO RELATED APPLICATIONS

This document claims priority to Japanese Patent Application No. 2017-234267 filed Dec. 6, 2017, the entire contents of which are hereby incorporated by reference.

BACKGROUND

A semiconductor manufacturing apparatus includes a polishing unit for performing a polishing process of a substrate, a cleaning unit for performing a cleaning process and a drying process of the substrate, a load/unload unit for transferring the substrate to the polishing unit and receiving the cleaning processed and drying processed substrate by the cleaning unit, and a controller for performing various controls with respect to a substrate processing apparatus.

It is necessary for the semiconductor manufacturing apparatus to be designed to satisfy a specification required by a user. More specifically, the semiconductor manufacturing apparatus is designed to conform to a specification document (manufacturing specification contact document) received from the user. This specification document is, for example, a specification document prepared based on an agreement with the user. For example, various sensors are provided to the polishing unit according to the requirement from the user. Hereinafter, a method of designing the semiconductor manufacturing apparatus, more specifically, a specification of the polishing unit based on a specification document, will be described with reference to the drawings.

FIG. 13 is a view showing a flow for determining the specification of the polishing unit based on the specification document. First, a program setting file storing information on a program with respect to the polishing process of the substrate is manually created so as to conform to a content of the specification document (manufacturing specification contact document) (see steps S201 and S202 in FIG. 13).

In the same manner, a sensor setting file storing information on a sensor provided in the polishing unit according to a condition of the polishing process of the substrate is manually created so as to conform to a content of the specification document (see step S203 in FIG. 13).

As shown in step S204 in FIG. 13, a program installer for introducing a program necessary for executing a process with respect to the polishing unit to the controller is manually created. Thereafter, the program is manually introduced to the controller (see step S205 in FIG. 13).

However, the specification of the semiconductor manufacturing apparatus is manually determined based on the specification document. Therefore, human error may occur.

The period of designing the semiconductor manufacturing apparatus based on the specification document may be extended for a long period of time. Therefore, if the user changes the content of the specification document during this period, in order to reflect the content of the changed specification document on the specification of the semiconductor manufacturing apparatus, it is necessary to redesign the semiconductor manufacturing apparatus. Similarly, if the user changes the specification of the semiconductor manufacturing apparatus after the semiconductor manufacturing apparatus is delivered, it is necessary to redesign the semiconductor manufacturing apparatus. Even in such a case, human error may occur.

SUMMARY OF THE INVENTION

According to an embodiment, there is provided a design method of a semiconductor manufacturing apparatus which can satisfy a specification required by a user. According to an embodiment, there is provided a non-transitory computer-readable storage medium storing a program of causing computer to execute the design method of the semiconductor manufacturing apparatus.

Embodiments, which will be described below, relate to a design method of a semiconductor manufacturing apparatus and a program of causing computer to execute the design method of the semiconductor manufacturing apparatus.

In an embodiment, there is provided a design method of a semiconductor manufacturing apparatus comprising: creating a program setting file storing setting information of a program necessary for executing a process with respect to the semiconductor manufacturing apparatus based on a requirement specification from a user; creating a program installer for introducing the program into a controller of the semiconductor manufacturing apparatus from the program setting file; operating a processing unit of the semiconductor manufacturing apparatus; specifying a sensor corresponding to the processing unit based on the operation of the processing unit; creating a sensor setting file storing information obtained by specifying the sensor; comparing a content of the requirement specification and a content of the sensor setting file to confirm a consistency between the content of the requirement specification and the content of the sensor setting file; and introducing the program into a memory of the controller by the program installer when the content of the requirement specification and the content of the sensor setting file are consistent with each other.

In a preferred aspect, specifying the sensor comprises: operating the processing unit to output sensor data from the sensor; and specifying the sensor corresponding to the processing unit based on the output sensor data.

In a preferred aspect, specifying the sensor comprises: rotating a plurality of polishing tables at different rotational speeds, in a state of connecting a table torque sensor to at least one of the polishing tables in the processing unit; confirming the presence or absence of output of the sensor data of the table torque sensor; and determining whether or not the table torque sensor is connected to each of the polishing tables based on the presence or absence of output of the sensor data.

In a preferred aspect, specifying the sensor comprises: specifying the table torque sensor corresponding to each of the polishing tables based on different sensor data of a plurality of table torque sensors output corresponding to the different rotational speeds when determining connections of the table torque sensors to the polishing tables.

In a preferred aspect, specifying the sensor comprises: rotating the polishing tables at different rotational speeds in a state of connecting a trigger sensor and a film thickness measurement sensor corresponding to the trigger sensor to at least one of the polishing tables in the processing unit; confirming the presence or absence of sensor data of the film thickness measurement sensor at a timing of a trigger signal output by the trigger sensor; and determining whether or not the film thickness measurement sensor is connected to each of the polishing tables based on the presence or absence of output of the sensor data.

In a preferred aspect, specifying the sensor comprises: specifying the film thickness measurement sensor corresponding to each of the polishing tables based on the sensor data of the film thickness measurement sensor at different timings of trigger signals when specifying connection of film thickness measurement sensors to the polishing tables.

In another embodiment, there is provided a non-transitory computer-readable storage medium storing a program of causing a computer to execute a design method of a semiconductor manufacturing apparatus, the program causing the computer to perform operations of: creating a program setting file storing setting information of a program necessary for executing a process with respect to the semiconductor manufacturing apparatus based on a requirement specification from a user; creating a program installer for introducing the program necessary for executing the process into a controller of the semiconductor manufacturing apparatus from the program setting file; operating a processing unit of the semiconductor manufacturing apparatus; specifying a sensor corresponding to the processing unit based on the operation of the processing unit; creating a sensor setting file storing information obtained by specifying the sensor; comparing a content of the requirement specification and a content of the sensor setting file to confirm a consistency between the content of the requirement specification and the content of the sensor setting file; and introducing the program necessary for executing the process into a memory of the controller by the program installer when the content of the requirement specification and the content of the sensor setting file are consistent with each other.

In a preferred aspect, causing the computer to perform the operations comprises causing the computer to perform operations of: operating the processing unit to output sensor data from the sensor; and specifying the sensor corresponding to the processing unit based on the output sensor data.

In a preferred aspect, causing the computer to perform the operations comprises causing the computer to perform operations of: rotating a plurality of polishing tables at different rotational speeds, in a state of connecting a table torque sensor to at least one of the polishing tables in the processing unit; confirming the presence or absence of output of the sensor data of the table torque sensor; and determining whether or not the table torque sensor is connected to each of the polishing tables based on the presence or absence of output of the sensor data.

In a preferred aspect, causing the computer to perform the operations comprises causing the computer to perform operations of: specifying the table torque sensor corresponding to each of the polishing tables based on different sensor data of a plurality of table torque sensors output according to the different rotational speeds when determining connections of the table torque sensors to the polishing tables.

In a preferred aspect, causing the computer to perform the operations comprises causing the computer to perform operations of: rotating the polishing tables at different rotational speeds, respectively, in a state of connecting a trigger sensor and a film thickness measurement sensor corresponding to the trigger sensor to at least one of the polishing tables in the processing unit; confirming the presence or absence of sensor data of the film thickness measurement sensor at a timing of a trigger signal output by the trigger sensor; and determining whether or not the film thickness measurement sensor is connected to each of the polishing tables based on the presence or absence of output of the sensor data.

In a preferred aspect, causing the computer to perform the operations comprises causing the computer to perform operations of: specifying the film thickness measurement sensor corresponding to each of the polishing tables based on the sensor data of the film thickness measurement sensor at different timings of trigger signals when specifying the connections of film thickness measurement sensors to the polishing tables. A sensor corresponding to the processing unit is specified based on the operation of the processing unit, and the sensor setting file storing information obtained by specifying this sensor is created. When the content of the requirement specification from the user and the content of the sensor setting file are consistent with each other, the program is introduced. Therefore, human error with respect to the design of the semiconductor manufacturing apparatus is prevented.

DESCRIPTION OF EMBODIMENTS

Figure 1:
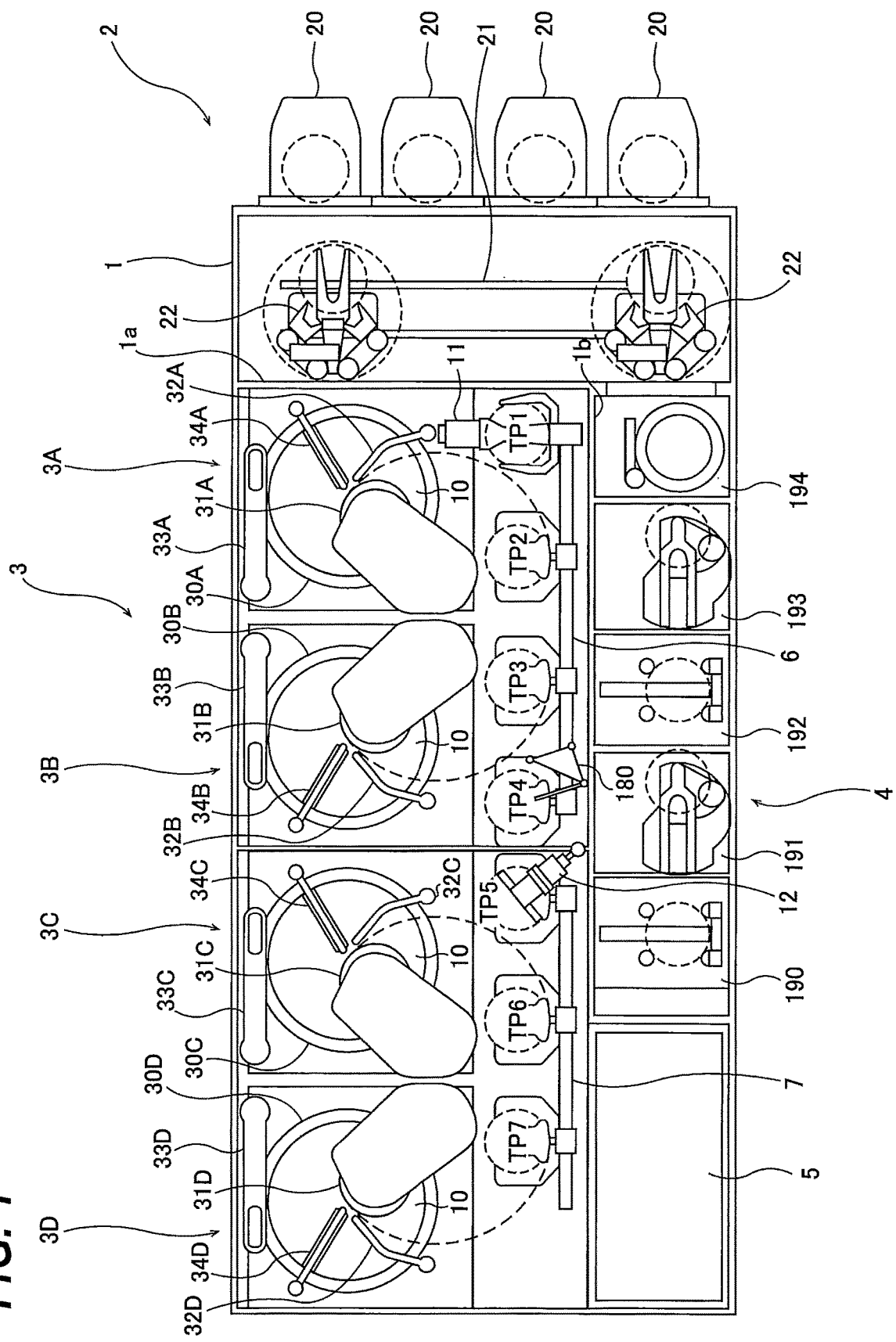
FIG. 1 is a plan view showing an embodiment of a semiconductor manufacturing apparatus.

Embodiments will be described below with reference to the drawings. Identical or corresponding structural elements are denoted by identical reference numerals and will not be described below repetitively.

FIG. 1 is a plan view showing an embodiment of a semiconductor manufacturing apparatus. As shown in FIG. 1, the semiconductor manufacturing apparatus includes a housing 1 in a generally-rectangular shape. An interior space of the housing 1 is divided into a loading/unloading unit 2, a polishing unit 3, and a cleaning unit 4 by partition walls 1a, 1b. The loading/unloading unit 2, the polishing unit 3, and the cleaning unit 4 are assembled independently of each other, and air is discharged independently of each other. The semiconductor manufacturing apparatus includes a controller 5 configured to control substrate processing operations.

The loading/unloading unit 2 includes two or more (four in this embodiment) front load sections 20 on which wafer cassettes, each storing plural wafers (substrate), are placed. These front load sections 20 are arranged adjacent to the housing 1 along a width direction of the semiconductor manufacturing apparatus (a direction perpendicular to a longitudinal direction). Each of the front loading sections 20 is capable of receiving thereon an open cassette, an SMIF (Standard Manufacturing Interface) pod, or a FOUP (Front Opening Unified Pod). The SMIF and FOUP are a hermetically sealed container which houses a wafer cassette therein and is covered with a partition to thereby provide interior environments isolated from an external space.

The loading/unloading unit 2 includes a moving mechanism 21 extending along an arrangement direction of the front load sections 20. Two transport robots (loaders or transport mechanism) 22 are installed on the moving mechanism 21 and are movable along the arrangement direction of the wafer cassettes. The transport robots 22 are configured to move on the moving mechanism 21 so as to access the wafer cassettes mounted on the front loading sections 20. Each transport robot 22 includes vertically arranged two hands, which are separately used. The upper hand can be used for returning a processed wafer to the wafer cassette, and the lower hand can be used for taking out a wafer to be processed from the wafer cassette. The lower hand of the transport robot 22 is configured to rotate about its own axis, so that it can reverse the wafer.

The load/unloading unit 2 is required to be a cleanest area. Therefore, a pressure in the interior of the loading/unloading unit 2 is kept higher at all times than pressures in the exterior space of the semiconductor manufacturing apparatus, the polishing unit 3, and the cleaning unit 4. On the other hand, the polishing unit 3 is the dirtiest area, because slurry is used as a polishing liquid. Therefore, negative pressure is developed in the polishing unit 3, and the pressure in the polishing unit 3 is kept lower than the internal pressure of the cleaning unit 4. A filter fan unit (not shown) having a clean air filter, such as a HEPA filter, an ULPA filter, or a chemical filter, is provided in the loading/unloading unit 2. The filter fan unit removes particles, toxic vapor, and toxic gas from air to form flow of clean air at all times.

The polishing unit 3 is an area where the wafer is polished (planarized). The polishing unit 3 includes a first polishing unit 3A, a second polishing unit 3B, a third polishing unit 3C, and a fourth polishing unit 3D. As shown in FIG. 1, the first polishing unit 3A, the second polishing unit 3B, the third polishing unit 3C, and the fourth polishing unit 3D are arranged along the longitudinal direction of the semiconductor manufacturing apparatus.

As shown in FIG. 1, the first polishing unit 3A includes a polishing table 30A to which a polishing pad 10 having a polishing surface is attached, a top ring 31A for holding the wafer and pressing the wafer against the polishing pad 10 on the polishing table 30A to polish the wafer, a polishing liquid supply nozzle 32A for supplying a polishing liquid and a dressing liquid (e.g., pure water) onto the polishing pad 10, and an atomizer 34A for ejecting a mixture of a liquid (e.g., pure water) and a gas (e.g., nitrogen gas) or a liquid (e.g., pure water) in an atomized state onto the polishing surface.

Similarly, the second polishing unit 3B includes a polishing table 30B to which a polishing pad 10 is attached, a top ring 31B, a polishing liquid supply nozzle 32B, a dresser 33B, and an atomizer 34B. The third polishing unit 3C includes a polishing table 30C to which a polishing pad 10 is attached, a top ring 31C, a polishing liquid supply nozzle 32C, a dresser 33C, and an atomizer 34C. The fourth polishing unit 3D includes a polishing table 30D to which a polishing pad 10 is attached, a top ring 31D, a polishing liquid supply nozzle 32D, a dresser 33D, and an atomizer 34D.

The first polishing unit 3A, the second polishing unit 3B, the third polishing unit 3C, and the fourth polishing unit 3D have the same configuration. Therefore, the first polishing unit 3A will be described below.

Figure 2:
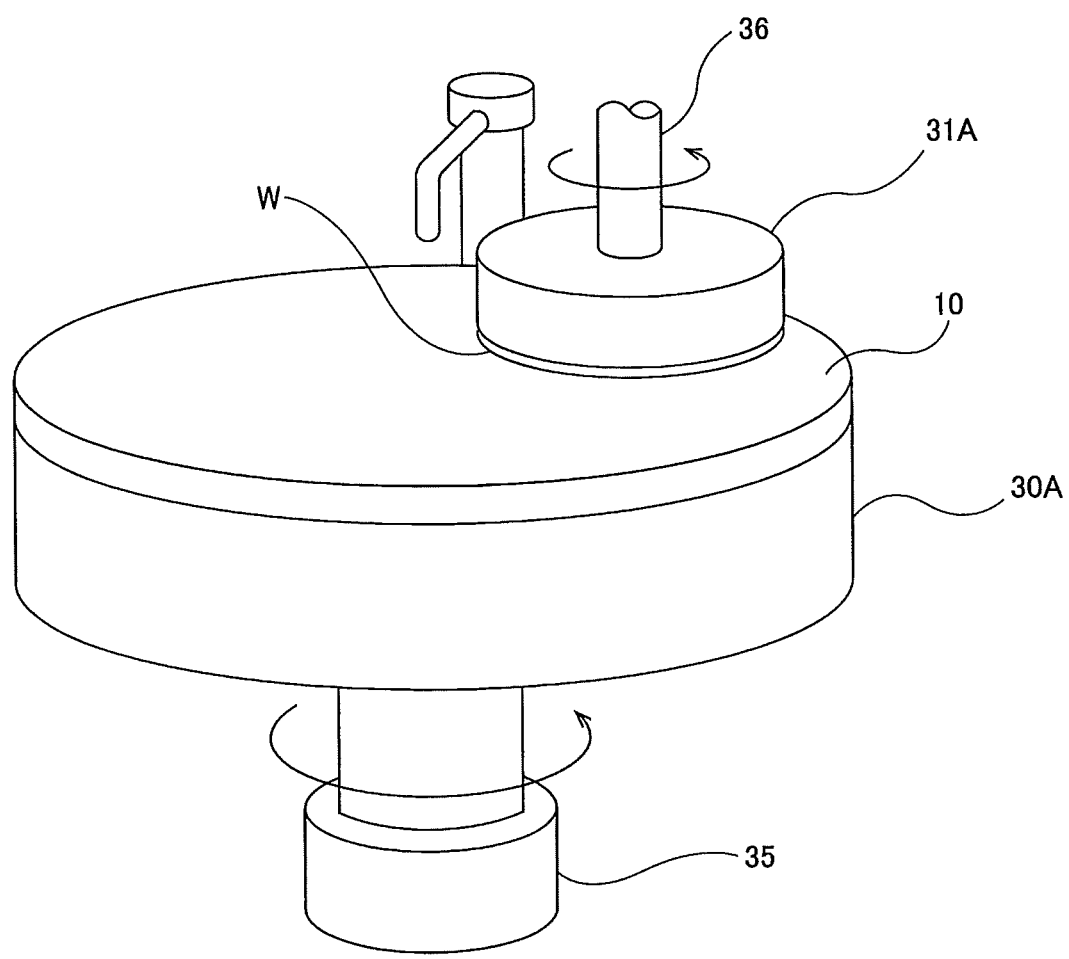
FIG. 2 is a perspective view schematically showing a first polishing unit.

FIG. 2 is a perspective view schematically showing the first polishing unit 3A. The top ring 31A is supported by a top ring shaft 36. The polishing pad 10 is attached to an upper surface of the polishing table 30A. An upper surface of the polishing pad 10 provides the polishing surface where a wafer W is polished. Instead of the polishing pad 10, a fixed abrasive may be used. The top ring 31A and the polishing table 30A are configured to rotate about their own axes, as indicated by arrows. The wafer W is held on a lower surface of the top ring 31A via vacuum suction. During polishing, the polishing liquid supply nozzle 32A supplies the polishing liquid onto the polishing surface of the polishing pad 10, and the top ring 31A presses the wafer W as an object to be polished against the polishing surface to thereby polish the wafer W.

The polishing unit 3A further includes a polishing-table drive motor 35 which rotates the polishing table 30A. The polishing table 30A is rotated at a desired rotational speed by the polishing-table drive motor 35.

The transport mechanism for transporting a wafer will be described. As shown in FIG. 1, a first linear transporter 6 is disposed adjacent to the first polishing unit 3A and the second polishing unit 3B. The first linear transporter 6 is a mechanism for transporting a wafer between four transport positions (i.e., a first transport position TP1, a second transport position TP2, a third transport position TP3, and a fourth transport position TP4 spaced successively from the loading/unloading unit), arrayed along the direction in which the polishing units 3A, 3B are arrayed.

A second linear transporter 7 is disposed adjacent to the third polishing unit 3C and the fourth polishing unit 3D. The second linear transporter 7 is a mechanism for transporting a wafer between three transport positions (i.e., a fifth transport position TP5, a sixth transport position TP6, and a seventh transport position TP7 spaced successively from the loading/unloading unit), arrayed along the direction in which the polishing units 3C, 3D are arrayed.

A wafer is transported to the polishing units 3A, 3B by the first linear transporter 6. The top ring 31A of the first polishing unit 3A is movable between a polishing position and the second transport position TP2 by a swing operation of a top ring head. Therefore, the transfer of the wafer to the top ring 31A is performed at the second transport position TP2. Similarly, the top ring 31B of the second polishing unit 3B is movable between a polishing position and the third transport position TP3, and the transfer of the wafer to the top ring 31B is performed at the third transport position TP3. The top ring 31C of the third polishing unit 3C is movable a polishing position and the sixth transport position TP6, and the transfer of the wafer to the top ring 31C is performed at the sixth transport position TP6. The top ring 31D of the fourth polishing unit 3D is movable between a polishing position and the seventh transport position TP7, and the transfer of the wafer to the top ring 31D is performed at the seventh transport position TP7.

A lifter 11 for receiving the wafer from the transport robot 22 is disposed in the first transport position TP1. The wafer is transferred from the transport robot 22 to the first linear transporter 6 by the lifter 11. The partition 1a has a shutter (not shown) positioned therein between the lifter 11 and the transport robot 22. When the wafer is to be transferred, the shutter is opened to allow the transport robot 22 to transfer the wafer to the lifer 11. A swing transporter 12 is disposed between the first linear transporter 6, the second linear transporter 7, and the cleaning unit 4. The swing transporter 12 has a hand movable between the fourth transport position TP4 and the fifth transport position TP5. The transfer of the wafer from the first linear transporter 6 to the second linear transporter 7 is performed by the swing transporter 12. The wafer is transported to the third polishing unit 3C and/or the fourth polishing unit 3D by the second linear transporter 7. Further, the wafer that has been polished in the polishing unit 3 is transported to the cleaning unit 4 by the swing transporter 12.

Figure 3A:
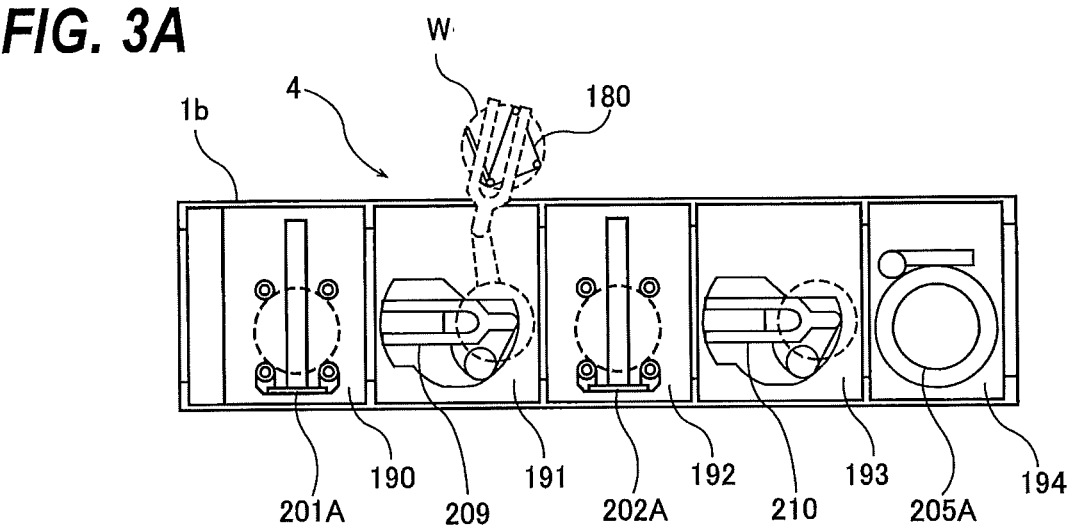
FIG. 3A is a plan view showing a cleaning unit.
Figure 3B:
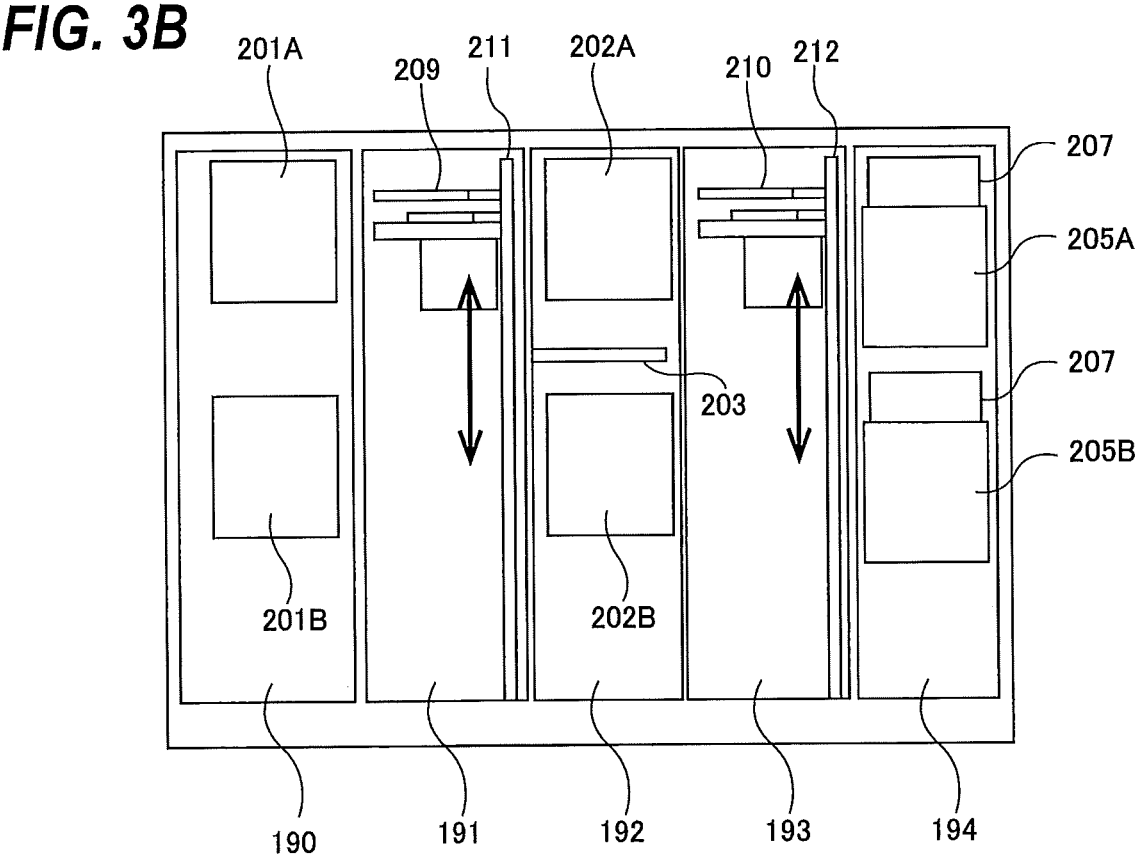
FIG. 3B is a side view showing the cleaning unit.

FIG. 3A is a plan view showing the cleaning unit 4. FIG. 3B is a side view showing the cleaning unit 4. As shown in FIG. 3A and FIG. 3B, the cleaning unit 4 includes a first cleaning chamber 190, a first transfer chamber 191, a second cleaning chamber 192, a second transfer chamber 193, and a drying chamber 194. In the first cleaning chamber 190, an upper primary cleaning module 201A and a lower primary cleaning module 201B are disposed. These primary cleaning modules 201A and 201B are aligned along a vertical direction. Specifically, the upper primary cleaning module 201A is arranged above the lower primary cleaning module 201B. Similarly, an upper secondary cleaning module 202A and a lower secondary cleaning module 202B are disposed in the second cleaning chamber 192, and are aligned along the vertical direction. The upper secondary cleaning module 202A is arranged above the lower secondary cleaning module 202B. The first and secondary cleaning modules 201A, 201B, 202A, and 202B are a cleaning machine for cleaning the wafer using a cleaning liquid. The arrangement of these cleaning modules 201A, 201B, 202A, and 202B along the vertical direction presents an advantage of reducing a footprint.

A temporary base 203 for the wafer is provided between the upper secondary cleaning module 202A and the lower secondary cleaning module 202B. In the drying chamber 194, an upper drying module 205A and a lower drying module 205B are disposed along the vertical direction. The upper drying module 205A and the lower drying module 205B are isolated from each other. Filter fan units 207 and 207 are provided on upper portions of the upper drying module 205A and the lower drying module 205B so as to supply a clean air to these drying modules 205A and 205B, respectively. The upper primary cleaning module 201A, the lower primary cleaning module 201B, the upper secondary cleaning module 202A, the lower secondary cleaning module 202B, the temporary base 203, the upper drying module 205A, and the lower drying module 205B are mounted on non-illustrated frames via bolts or the like.

A vertically-movable first transfer robot (transport mechanism) 209 is provided in the first transfer chamber 191, and a vertically-movable second transfer robot 210 is provided in the second transfer chamber 193. The first transfer robot 209 and the second transfer robot 210 are movably supported by vertically-extending support shafts 211 and 212. The first transfer robot 209 and the second transfer robot 210 have drive mechanisms (e.g., motors) therein, respectively, so that the transfer robots 209 and 210 can move along the support shafts 211 and 212 in the vertical directions. The first transfer robot 209 has vertically arranged two hands: an upper hand and a lower hand, as with the transfer robot 22. The first transfer robot 209 is located such that the lower hand thereof can access the above-described temporary base 180, as indicated by a dotted line in FIG. 3A. When the lower hand of the first transfer robot 209 accesses the temporary base 180, a shutter (not shown) on the partition 1b is opened.

The first transfer robot 209 is configured to transfer the wafer W between the temporary base 180, the upper primary cleaning module 201A, the lower primary cleaning module 201B, the temporary base 203, the upper secondary cleaning module 202A, and the lower secondary cleaning module 202B. When transferring a wafer to be cleaned (i.e., a wafer with slurry attached), the first transfer robot 209 uses its lower hand. On the other hand, when transferring a cleaned wafer, the first transfer robot 209 uses its upper hand. The second transfer robot 210 is configured to transfer the wafer W between the upper secondary cleaning module 202A, the lower secondary cleaning module 202B, the temporary base 203, the upper drying module 205A, and the lower drying module 205B. The second transfer robot 210 transfers only a cleaned wafer, and thus has a single hand. The transfer robot 22 shown in FIG. 1 uses its upper hand to remove the wafer from the upper drying module 205A or the lower drying module 205B, and returns the wafer to the wafer cassette. When the upper hand of the transfer robot 22 accesses the drying modules 205A, 205B, a shutter (not shown) on the partition 1a is opened.

As described above, the semiconductor manufacturing apparatus includes the loading/unloading unit 2, the polishing unit 3, and the cleaning unit 4. Hereinafter, these units 2 to 4 may be referred to as processing units without distinction, respectively. These processing units are units configured to perform designated operations against the wafer, respectively. The designated operations include the operation of polishing a wafer, the operation of cleaning a wafer, and the operation of transporting a wafer.

Figure 4:
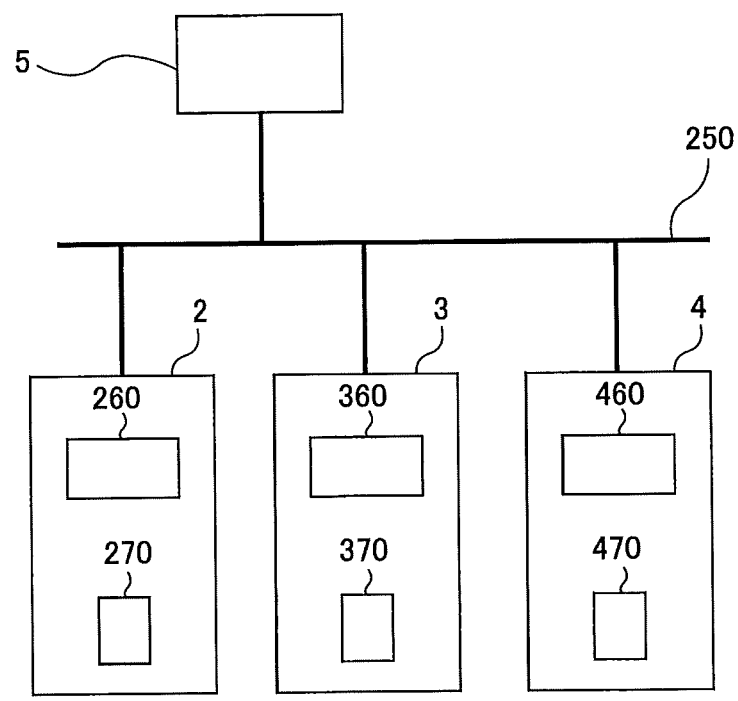
FIG. 4 is a schematic view showing a configuration of the semiconductor manufacturing apparatus.

FIG. 4 is a schematic view showing a configuration of the semiconductor manufacturing apparatus. A network 250 is built in the semiconductor manufacturing apparatus. The controller 5 is connected to the loading/unloading unit 2, the polishing unit 3, and the cleaning unit 4 through the network 250. Each component of each processing unit operates by a command from the controller 5. More specifically, the controller 5 controls the operation of the processing unit.

A sequencer 260 for controlling the operations of the components such as the transfer robot 22 and the like in the loading/unloading unit 2 is provided in the loading/unloading unit 2. A sensor 270 for detecting sensor data on the control of the loading/unloading unit 2 is provided in the loading/unloading unit 2. For example, the sensor 270 includes a sensor configured to detect whether or not a wafer is installed in the transfer robot 22.

A sequencer 360 for controlling the operations of the components such as the polishing table, the top ring, and the like, in the polishing unit 3 is provided in the polishing unit 3. A sensor 370 for detecting sensor data on the control of the polishing unit 3 is provided in the polishing unit 3. The sensor 370 includes a sensor configured to detect a flow rate of the polishing liquid supplied onto the polishing pad 10, a sensor configured to detect a rotational speed of the polishing table 30, a sensor configured to detect a rotary torque of the polishing table 30 or the top ring 31, and the like.

As shown in FIG. 4, a sequencer 460 for controlling the operations of the components such as the cleaning module, the transfer robot, and the like, in the cleaning unit 4 is provided in the cleaning unit 4. A sensor 470 configured to detect sensor data on the control of the cleaning unit 4 is provided in the cleaning unit 4. The sensor 470 includes a sensor configured to detect a flow rate of the cleaning liquid supplied onto the wafer, and the like.

Figure 5:
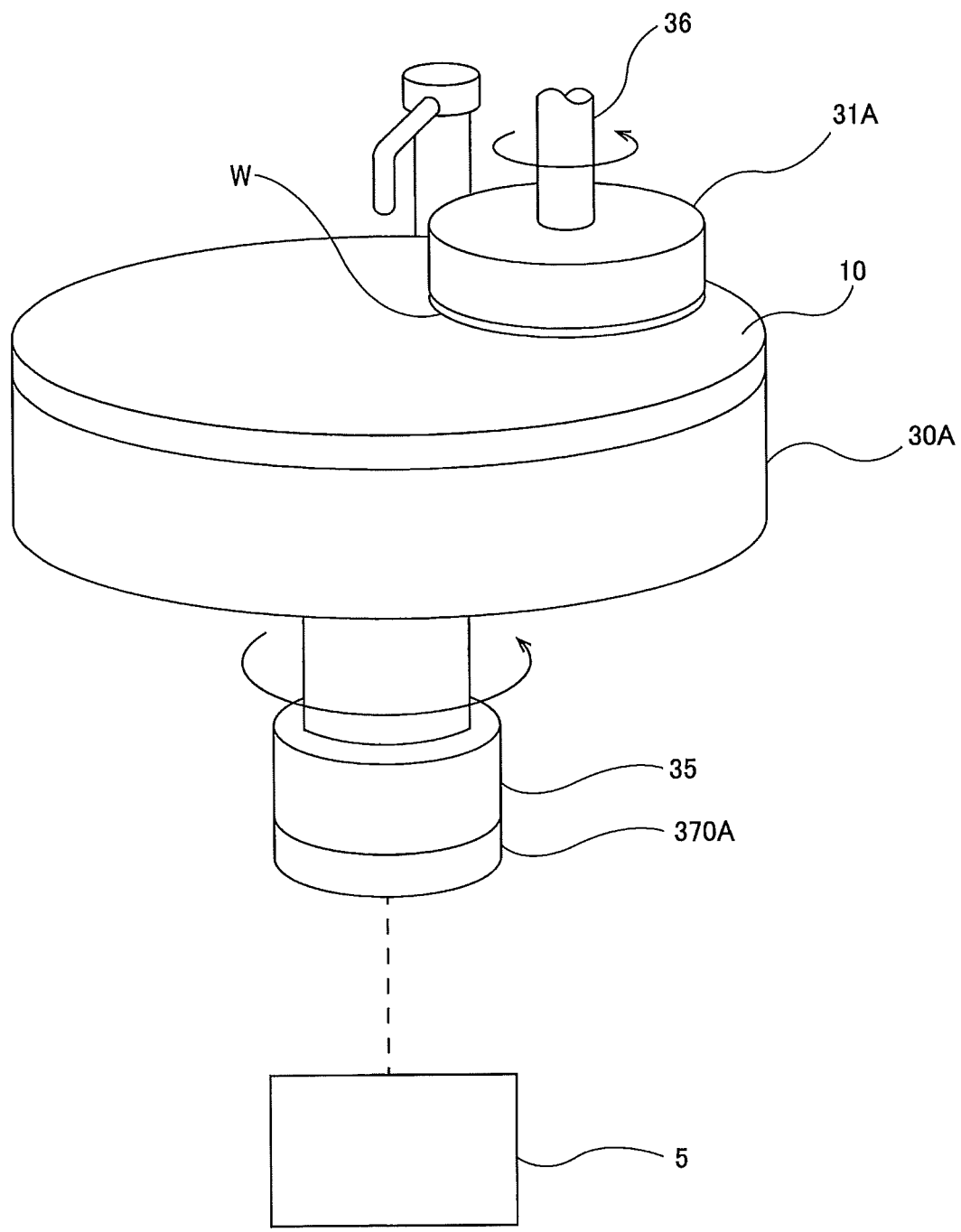
FIG. 5 is a view showing a table torque sensor.

In an embodiment, the sensor 370 of the polishing unit 3 includes a table torque sensor 370A configured to detect a motor torque of the polishing-table drive motor 35 which rotates the polishing table 30. FIG. 5 is a view showing the table torque sensor 370A. The table torque sensor 370A detects the motor torque of the polishing-table drive motor 35 based on a motor current value of the table drive motor 35. The table torque sensor 370A is connected to the controller 5 and sends the detected motor torque to the controller 5.

Figure 6:
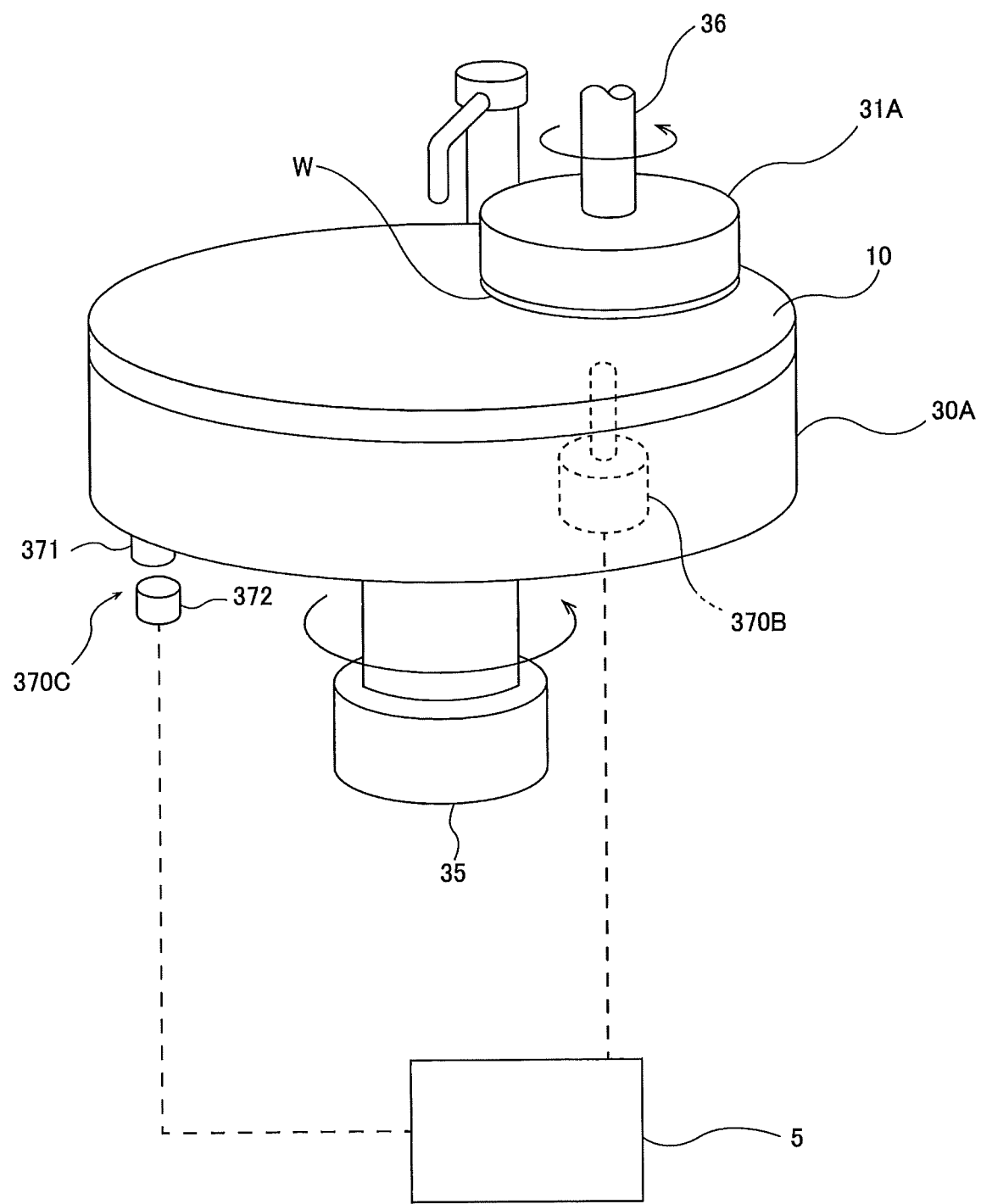
FIG. 6 is a view showing a film thickness measurement sensor.

In another embodiment, the sensor 370 includes a film thickness measurement sensor 370B configured to detect a film thickness of the wafer. FIG. 6 is a view showing the film thickness measurement sensor 370B. An example of the film thickness measurement sensor 370B includes an eddy current sensor or an optical sensor. The eddy current sensor is a sensor which detects the interlinkage flux generated by an eddy current in the wafer and detects the thickness of the wafer based on the detected interlinkage flux. The optical sensor is a sensor which irradiates the wafer with light and measures interference waves reflected from the wafer to detect the thickness of the wafer. The film thickness measurement sensor 370B is connected to the controller 5 and sends sensor data correlated with the film thickness of the wafer to the controller 5. When the sensor data from the film thickness measurement sensor 370B is input to the controller 5, the controller 5 converts the sensor data to a film thickness value of the wafer and detects a polishing end point according to a preset setting to terminate the polishing by the polishing unit 3.

As shown in FIG. 6, the sensor 370 includes a trigger sensor 370C configured to detect a rotation of the polishing table 30. The trigger sensor 370C includes a dog 371 disposed on a circumferential edge of the polishing table 30 and a proximity sensor 372 disposed close to the dog 371. The trigger sensor 370C detects a trigger signal indicating that the polishing table 30 makes one rotation based on a positional relationship between the proximity sensor 372 and the dog 371. More specifically, when the dog 371 is closest to the proximity sensor 372 by the rotation of the polishing table 30, i.e., when the dog 371 passes through the proximity sensor 372, the proximity sensor 372 detects the trigger signal. The proximity sensor 372 is connected to the controller 5 and sends the detected trigger signal to the controller 5.

The trigger sensor 370C is a sensor for detecting a measurement start timing (and a measurement end timing) of the film thickness measurement sensor 370B. The film thickness measurement sensor 370B performs a start (and an end) of the film thickness measurement of the wafer at a timing based on the trigger signal detected by the trigger sensor 370C.

Figure 7:
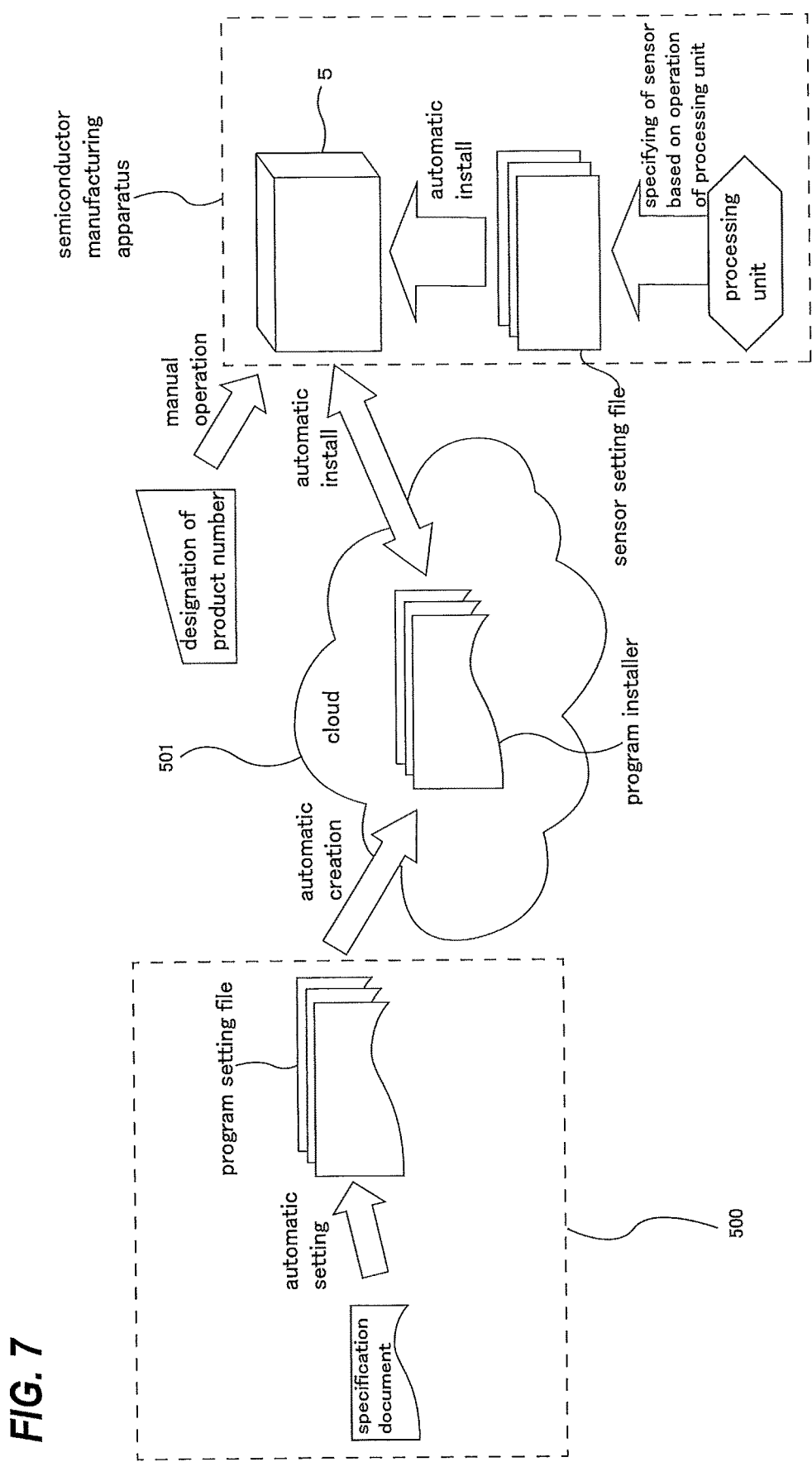
FIG. 7 is a view showing a design system of the semiconductor manufacturing apparatus.

A design system of the semiconductor manufacturing apparatus will be described. FIG. 7 is a view showing the design system of the semiconductor manufacturing apparatus. As shown in FIG. 7, the design system includes a design apparatus 500, a cloud apparatus 501 that provides a service to transmit and receive data through a network, and the semiconductor manufacturing apparatus. The design apparatus 500 executes a process of creating a program setting file in which setting information of a program necessary for executing a process with respect to the semiconductor manufacturing apparatus is set. The design apparatus 500 executes a process of creating a program installer for introducing a program into the controller 5.

Figure 8:
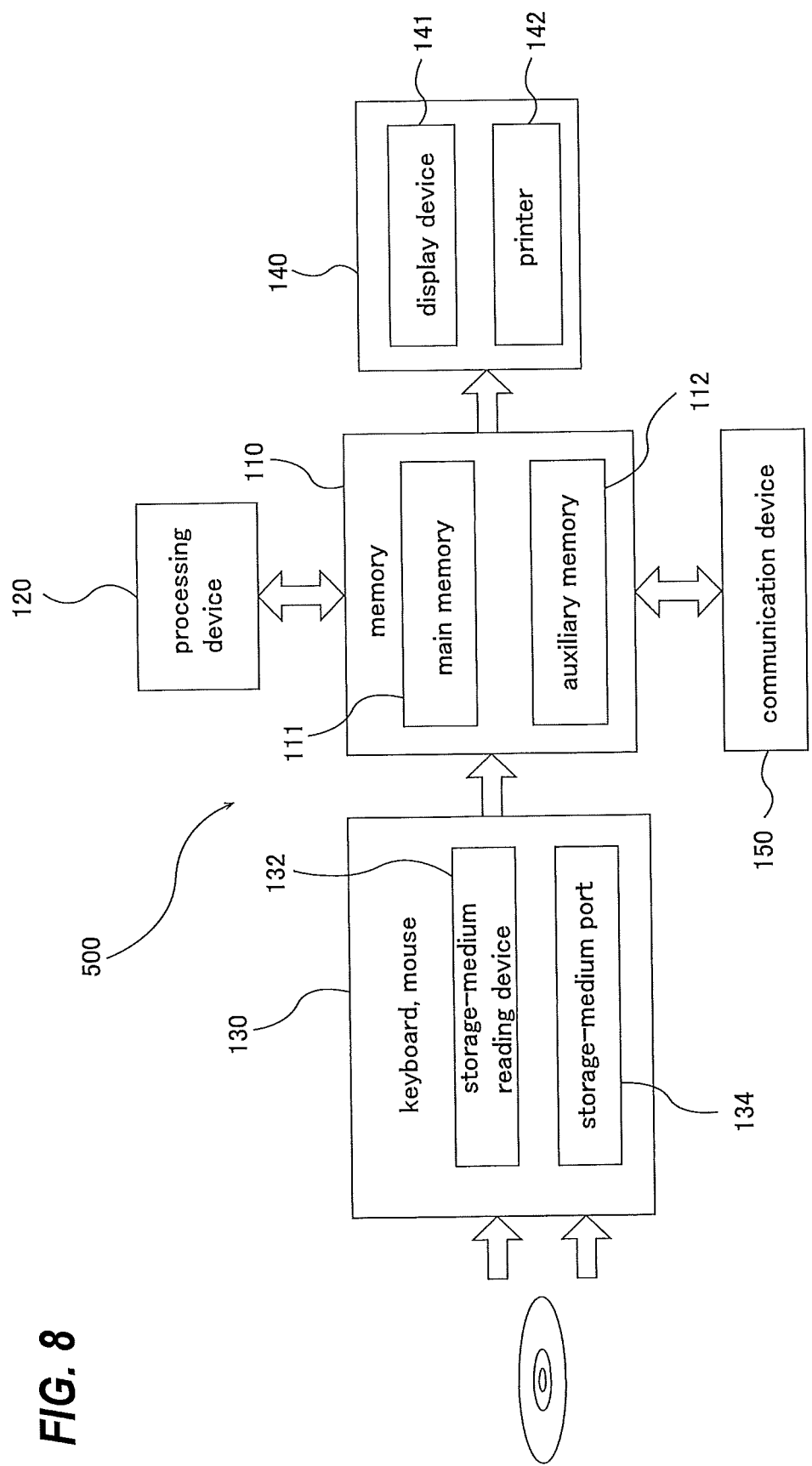
FIG. 8 is a schematic view a configuration of the design apparatus.

In this embodiment, the design apparatus 500 is constituted by a dedicated computer or a general-purpose computer. FIG. 8 is a schematic view a configuration of the design apparatus 500. The design apparatus 500 includes a memory 110 in which a program and data are stored, a processing device 120, such as CPU (central processing unit) or GPU (graphic processing unit), for performing arithmetic operation according to the program stored in the memory 110, an input device 130 for inputting the data, the program, and various information into the memory 110, an output device 140 for outputting processing results and processed data, and a communication device 150 for connecting to a network including the cloud apparatus 501.

The memory 110 includes a main memory 111 which is accessible by the processing device 120, and an auxiliary memory 112 that stores the data and the program therein. The main memory 111 may be a random-access memory (RAM), and the auxiliary memory 112 is a storage device which may be a hard disk drive (HDD) or a solid-state drive (SSD).

The input device 130 includes a keyboard and a mouse, and further includes a storage-medium reading device 132 for reading the data from a storage medium, and a storage-medium port 134 to which a storage medium can be connected. The storage medium is a non-transitory tangible computer-readable storage medium. Examples of the storage medium include optical disk (e.g., CD-ROM, DVD-ROM) and semiconductor memory (e.g., USB flash drive, memory card). Examples of the storage-medium reading device 132 include optical disk drive (e.g., CD-ROM drive, DVD-ROM drive) and card reader. Examples of the storage-medium port 134 include USB port. The program and/or the data stored in the storage medium is introduced into the design apparatus 500 via the input device 130, and is stored in the auxiliary memory 112 of the memory 110. The output device 140 includes a display device 141 and a printer 142.

The controller 5 has the same configuration as the design apparatus 500. More specifically, the controller 5 is constituted by a dedicated computer or a general-purpose computer. The controller 5 includes a memory in which a program and data are stored, a processing device, such as CPU (central processing unit), for performing arithmetic operation according to the program stored in the memory, an input device for inputting the data, the program, and various information into the memory, an output device for outputting processing results and processed data, and a communication device for connecting to a network including the cloud apparatus 501.

Figure 9:
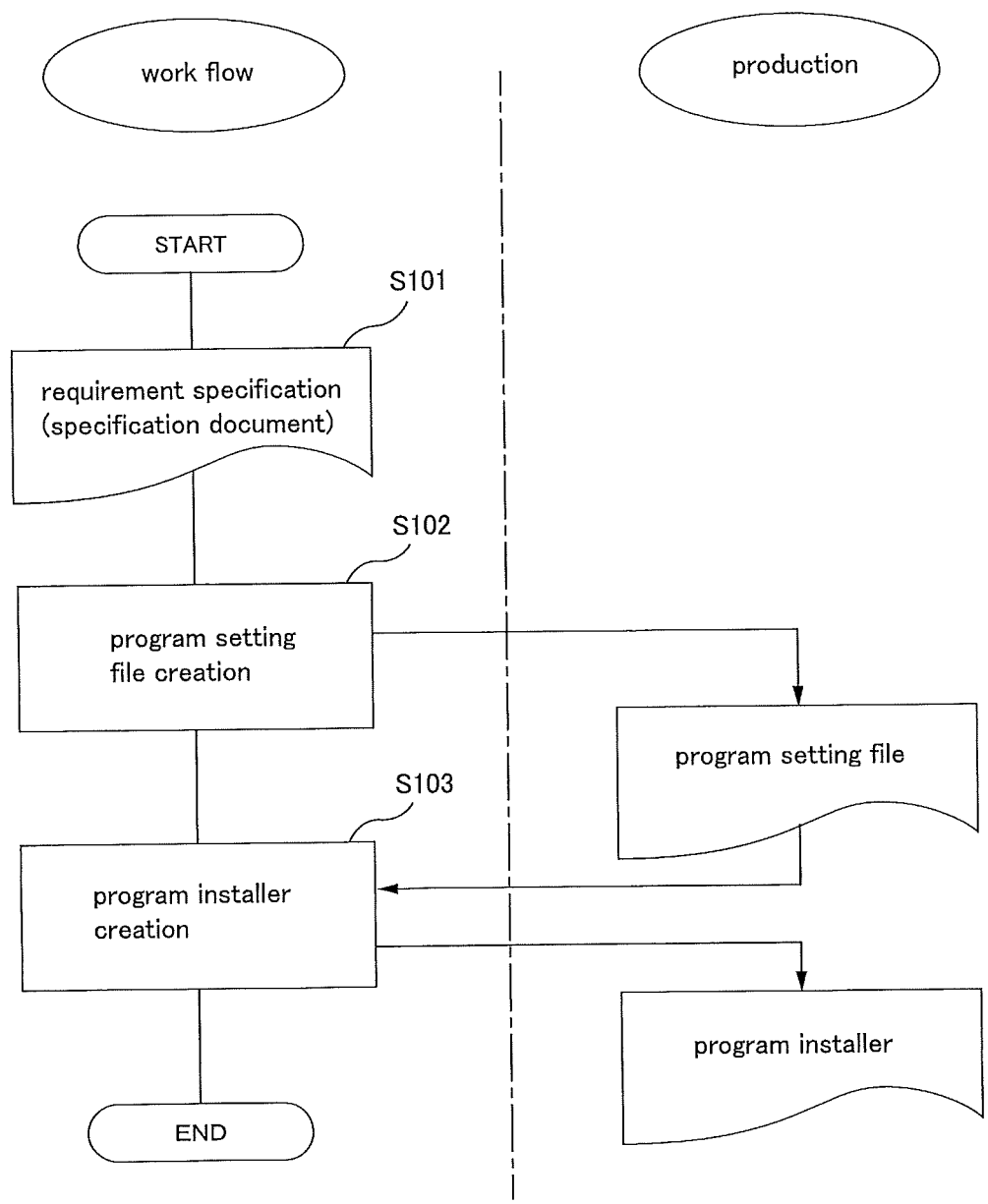
FIG. 9 is a view showing a flow of a design method of the semiconductor manufacturing apparatus.
Figure 10:
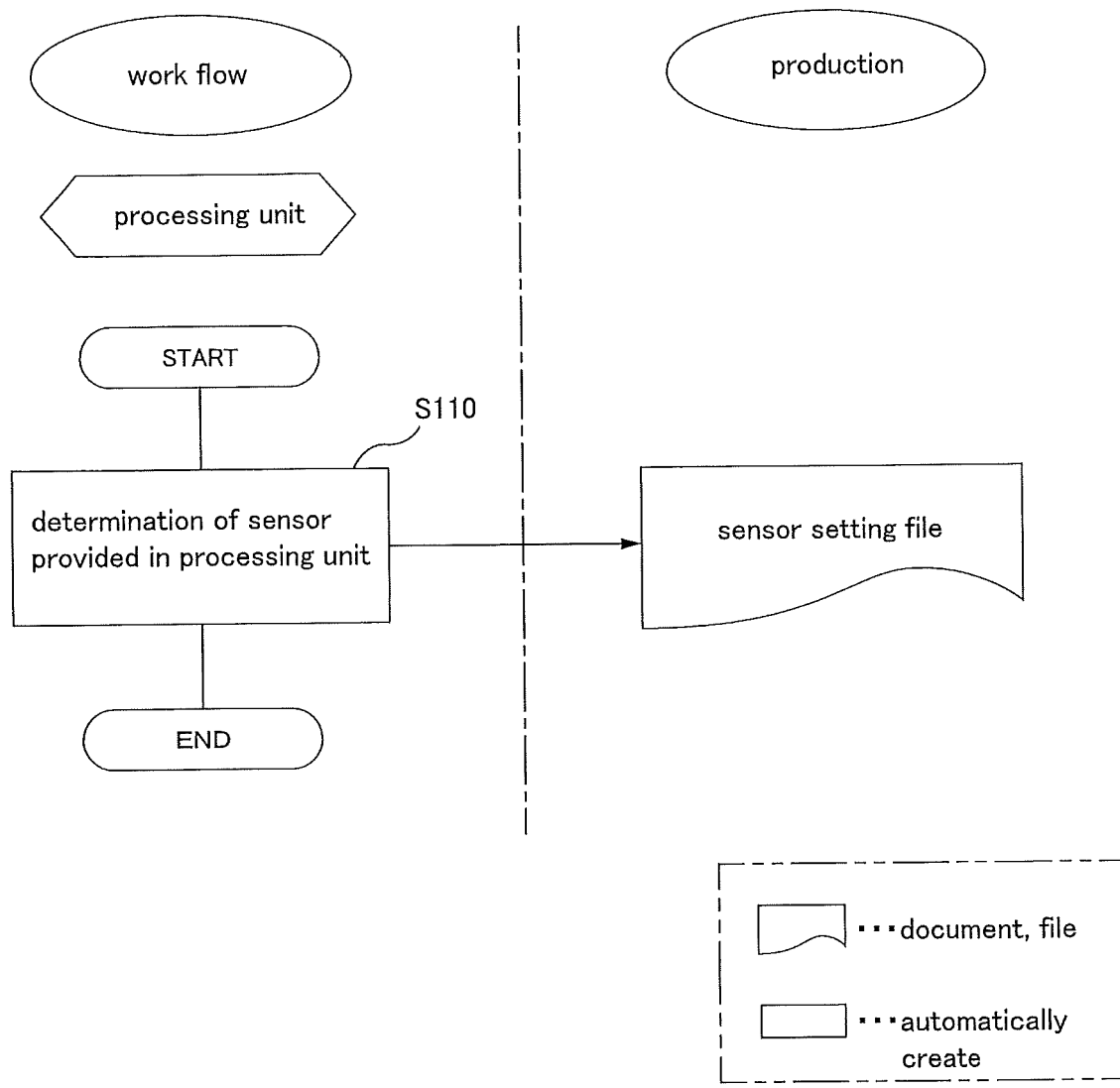
FIG. 10 is a view showing a flow of the design method of the semiconductor manufacturing apparatus.
Figure 11:
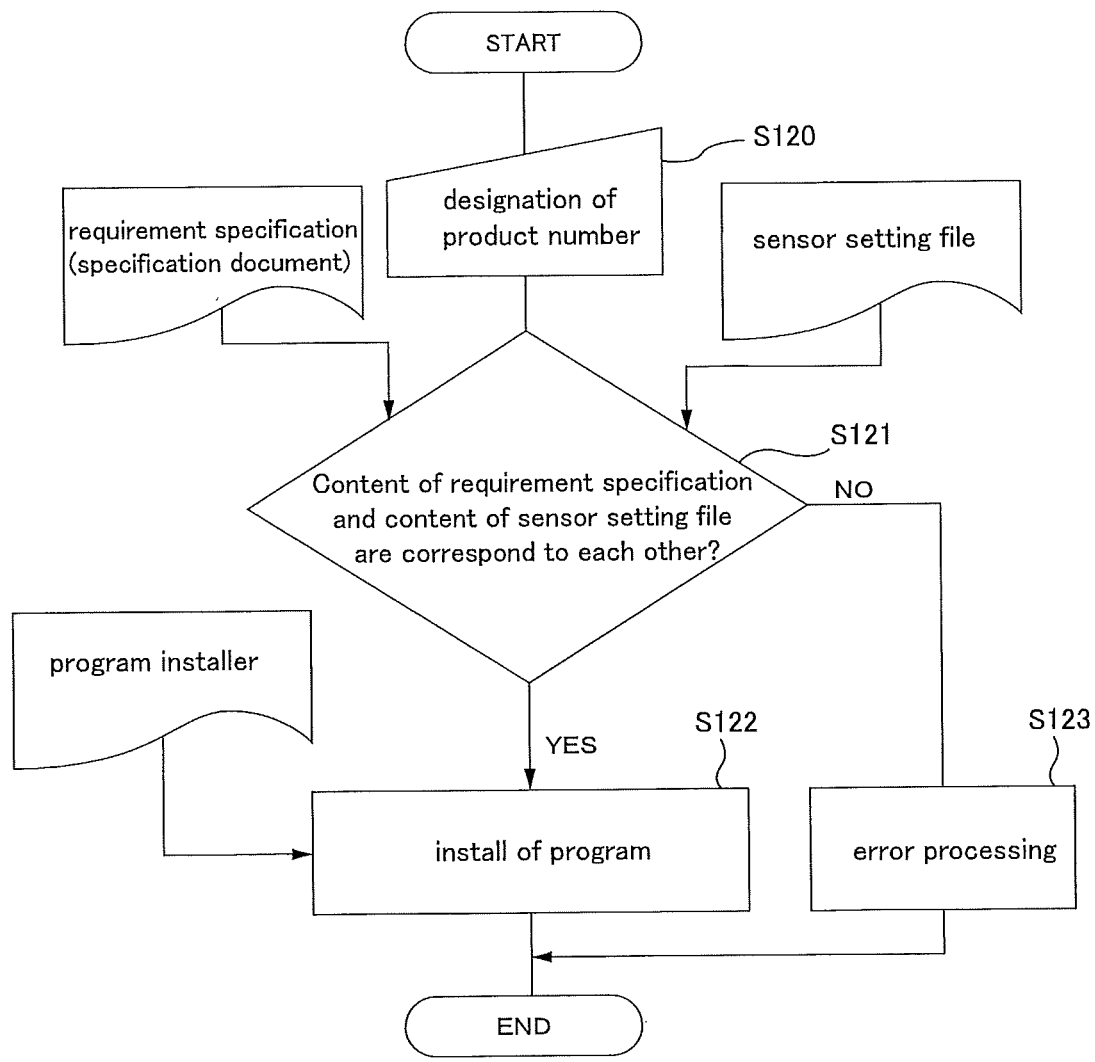
FIG. 11 is a view showing a flow of the design method of the semiconductor manufacturing apparatus.
Figure 11:
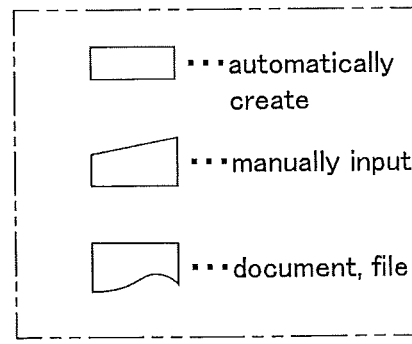

A design method of the semiconductor manufacturing apparatus for satisfying a specification required by the user will be described. FIGS. 9 to 11 are views showing a flow of the design method of the semiconductor manufacturing apparatus. First, the design apparatus 500 executes a process of automatically creating the program setting file so as to conform to a requirement of a requirement specification (specification document or manufacturing specification contact document) received from the user (see steps S101, S102 in FIG. 9). This program setting file is a file in which information (or setting) for operating a program necessary for executing a process with respect to the semiconductor manufacturing apparatus according to the specification is stored. More specifically, the program relates to a process of the wafer by the processing unit.

The above-described specification relates to designs of the semiconductor manufacturing apparatus such as a type of sensor to be mounted on the processing unit, in particular, a type of sensor selected according to a type of metal film (for example, copper (Cu), tungsten (W), titanium (Ti), etc.) to be laminated on the wafer, a size of the polishing table, the presence or absence of a closed loop control (CLC), a type of top ring, and the number of pressure chambers formed from an elastic membrane attached to a bottom of the top ring. The program setting file includes setting information for operating a program corresponding to the semiconductor manufacturing apparatus designed based on such specification. The created program setting file is stored in the memory 110 of the design apparatus 500.

Next, the design apparatus 500 executes a process of automatically creating a program installer for introducing the above-described program into the controller 5 from the program setting file stored in the memory 110 (see step S103 in FIG. 9). The created program installer is stored in the memory 110 of the design apparatus 500. As shown in FIG. 7, the design apparatus 500 executes a process of sending the program installer to the cloud apparatus 501 through the communication device 150. The program installer is stored in the cloud apparatus 501. The program installer is a set of files for operating a program including the program setting file.

In FIG. 10, the controller 5 executes a process of operating the processing unit, executes a process of automatically specifying a sensor corresponding to the processing unit based on the operation of the processing unit (see step S110 in FIG. 10), and executes a process of creating the sensor setting file in which information (data) obtained by the process of specifying the sensor is stored. In other words, the controller 5 operates the processing unit based on the program for operating the processing unit. A sensor connected to the controller 5 is in the processing unit so that the sensor data is output to the controller 5. The sensor outputs the sensor data detected by the operation of the processing unit to the controller 5. The controller 5 specifies the sensor corresponding to the processing unit based on the sensor data input in the controller 5, and creates information on the sensor corresponding to the processing unit, i.e., the sensor setting file having a content to be compared with a content of the requirement specification from the user.

The sensor setting file is automatically introduced in the memory of the controller 5. The sensor setting file is a file in which information on the sensor corresponding to the processing unit is stored. Information on the sensor corresponding to the processing unit is information for comparing whether or not the sensor to be mounted on the processing unit based on the specification required by the user and the sensor actually provided in the processing unit are consistent with each other. In other words, this information includes at least one of information on a sensor provided in the load/unload unit 2, information on a sensor provided in the polishing unit 3, and information on a sensor provided in the cleaning unit 4.

An embodiment of a process of automatically specifying a sensor corresponding to the processing unit is as follows. In other words, the controller 5 operates the processing unit to output the sensor data from the sensor. The controller 5 automatically specifies the sensor corresponding to the processing unit based on the sensor data from the sensor.

In an embodiment, a computer (not shown) which is different from the controller 5 may be connected to the controller 5. An automatic determination start command for specifying each of a plurality of sensors provided in each of a plurality of processing units by the controller 5 may be sent to the controller 5. Upon receiving the automatic determination start command sent from the above-described computer, the controller 5 may specify each of the sensors corresponding to each of the processing units.

Figure 12:
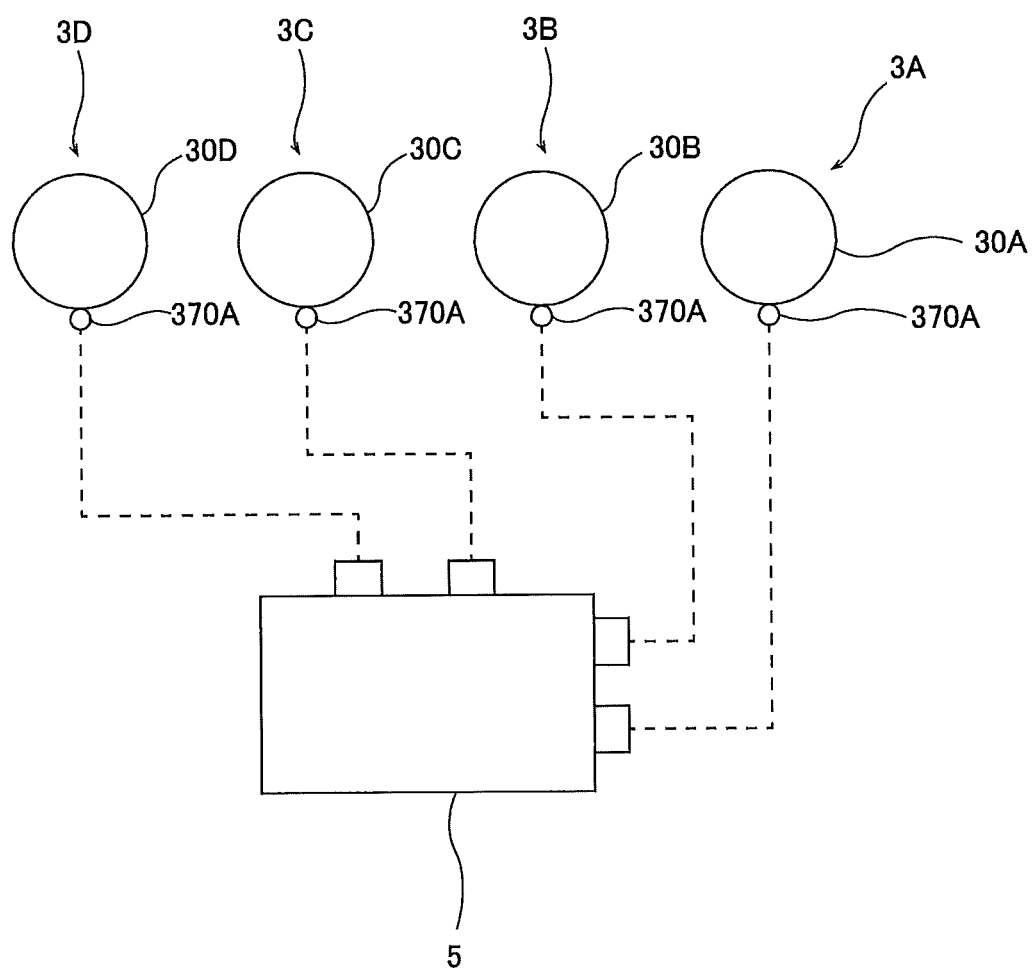
FIG. 12 is a view showing an embodiment of a process of automatically determining a sensor.

An embodiment of the process of automatically determining a sensor provided in the processing unit will be described. FIG. 12 is a view showing an embodiment of the process of automatically determining the sensor. In the embodiment shown in FIG. 12, the processing unit is a plurality of polishing units (more specifically, the first polishing unit 3A, the second polishing unit 3B, the third polishing unit 3C and the fourth polishing unit 3D). A plurality of sensors 370 (more specifically, the table torque sensors 370A) are provided in these polishing units 3A to 3D (more specifically, polishing tables 30A to 30D), respectively.

As shown in FIG. 12, each of the table torque sensors 370A is connected to the controller 5. In a state in which each of the table torque sensors 370A is connected to each of the polishing tables 30A to 30D, the controller 5 issues a command to the sequencer 360 to thereby rotate the polishing tables 30A to 30D of the polishing units 3A to 3D at different rotational speeds, respectively.

In an embodiment, the controller 5 may rotate the polishing table 30A at 30 min$^{-1}$, rotate the polishing table 30B at 60 min$^{-1}$, rotate the polishing table 30C at 90 min$^{-1}$, and rotate the polishing table 30D at 120 min$^{-1}$. However, as long as the polishing tables 30A to 30D can rotate at different rotational speeds, the rotational speeds of the polishing tables 30A to 30D are not limited to the above-described rotational speeds.

When the polishing-table drive motors 35 rotate the polishing tables 30A to 30D at different rotational speeds, a voltage applied to each polishing-table drive motor 35 is different to each other. Therefore, the controller 5 derives a voltage corresponding to each rotational speed applied to each polishing-table drive motor 35 from a motor current detected by each table torque sensor 370A. The controller 5 specifies the table torque sensors 370A corresponding to the polishing units 3A to 3D from these different voltages, respectively.

In the case where sensors of the different types are provided in the polishing tables 30A to 30D, respectively, even if the polishing tables 30A to 30D are rotated at the same rotational speed, each of the sensors provided in each of the polishing tables 30A to 30D can be specified depending on a type of sensor data sent from the sensor. However, in the case where the sensors of the same type are provided in the polishing tables 30A to 30D, respectively, each of the sensors provided in each of the polishing tables 30A to 30D cannot be specified. According to the method of this embodiment, it is possible not only to specify the sensors of the different types provided in the polishing tables 30A to 30D, respectively, but also to specify the sensors of the same type provided in the polishing tables 30A to 30D, respectively.

Another embodiment of a process of automatically specifying the sensor corresponding to the processing unit will be described. Even when each of the film thickness measurement sensors 370B (and the trigger sensors 370C) is connected to each of the polishing tables 30A to 30D, the controller 5 can specify each of the film thickness measurement sensors 370B corresponding to each of the polishing units 3A to 3D.

If the polishing-table drive motors 35 rotate the polishing tables 30A to 30D at different rotational speeds, respectively, the trigger sensors 370C output trigger signals at different timings, respectively. Therefore, the controller 5 can specify each of the film thickness measurement sensors 370B corresponding to each of the polishing units 3A to 3D based on the sensor data of the film thickness measurement sensors 370B at the different timings of the trigger signals output corresponding to the different rotational speeds.

The controller 5 specifies the sensor based on the sensor data of the sensor output according to the operation of the processing unit. Therefore, the controller 5 can determine whether or not the sensor is provided in the processing unit. In other words, in the case where the sensor does not output the sensor data based on the operation of the processing unit even if the controller 5 operates the processing unit, the controller 5 can specify that the sensor is not provided in the processing unit.

In an embodiment, in a state in which the table torque sensor 370A is connected to at least one of the polishing tables 30A to 30D, the controller 5 rotates the polishing tables 30A to 30D at different rotational speeds. The controller 5 confirms the presence or absence of output of the sensor data of the table torque sensor 370A to determine whether or not the table torque sensor 370A is connected to each of the polishing tables 30A to 30D based on the presence or absence of the sensor data.

In the case of specifying the polishing table 30 to which the table torque sensor 370A is not connected, since the sensor data of the table torque sensor 370A is not output to the controller 5, the controller 5 can specify the polishing table 30 to which the table torque sensor 370A is not connected. In the case of specifying each of the polishing tables 30A to 30D to which each of the table torque sensors 370A is connected, different sensor data are output from the table torque sensor 370A to the controller 5 corresponding to different rotational speeds of the polishing tables 30A to 30D. Therefore, the controller 5 can specify the table torque sensor 370A corresponding to each of the polishing tables 30A to 30D based on the different sensor data output from the table torque sensors 370A.

In another embodiment, in a state in which the trigger sensor 370C and the film thickness measurement sensor 370B corresponding to the trigger sensor 370C are connected to at least one of the polishing tables 30A to 30D, the controller 5 rotates the polishing tables 30A to 30D at the different rotational speeds. The controller 5 confirms the presence or absence of the sensor data of the film thickness measurement sensor 370B at a timing of the trigger signal output by the trigger sensor 370C to determine whether or not the film thickness measurement sensor 370B is connected to each of the polishing tables 30A to 30D based on the presence or absence of the sensor data.

In the case of specifying the polishing table 30 to which the film thickness measurement sensor 370B is not connected, since the sensor data of the film thickness measurement sensor 370B does not output to the controller 5, the controller 5 can specify the polishing table 30 to which the film thickness measurement sensor 370B is not connected. In the case of specifying each of the polishing tables 30A to 30D to which the film thickness measurement sensor 370B is connected, the controller 5 can specify the film thickness measurement sensor 370B corresponding to each of the polishing tables 30A to 30D based on different data intervals of the film thickness measurement sensor 370B output corresponding to the different rotational speeds of the polishing tables 30A to 30D (i.e., trigger signals output at the different timings from the trigger sensors 370C).

Even when both the table torque sensor 370A and the film thickness measurement sensor 370B (and trigger sensor 370C) are connected each of the polishing tables 30A to 30D, the controller 5 can specify the table torque sensor 370A and the film thickness measurement sensor 370B corresponding to each of the polishing tables 30A to 30D based on the different sensor data output from the table torque sensor 370A and the sensor data of the film thickness measurement sensor 370B at the different timings of the trigger signal of the trigger sensor 370C.

For example, in the case where two table torque sensors 370A are connected to the polishing tables 30A, 30B, and two film thickness measurement sensors 370B (and two trigger sensors 370C) are connected to the polishing tables 30C, 30D, the table torque sensors 370A and the trigger sensors 370C output different data by different rotations of the polishing tables 30A to 30D, respectively. Therefore, the controller 5 can specify a connection of the table torque sensor 370A to the polishing tables 30A, 30B and a connection of the film thickness measurement sensor 370B to the polishing tables 30C, 30D.

In the case where a plurality of semiconductor manufacturing apparatus are designed, in order to specify individual semiconductor manufacturing apparatuses out of the semiconductor manufacturing apparatuses, a product number assigned to the semiconductor manufacturing apparatus is manually designated (see FIG. 7 and step S120 in FIG. 11). The controller 5 compares the content (more specifically, content of the program setting file) of the requirement specification (specification document or manufacturing specification contact document) received from the user and the content of the sensor setting file and executes a process of confirming a consistency between the content of the requirement specification and the content of the sensor setting file (see step S121 in FIG. 11).

When the content of the requirement specification and the content of the sensor setting file are consistent with each other, i.e., when the contents correspond to each other, the controller 5 accesses the cloud apparatus 501 to execute a process of automatically introducing a program necessary for executing the process with respect to the semiconductor manufacturing apparatus, i.e., a program for operating the processing unit by the program installer stored in the cloud apparatus 501 in the memory of the controller 5 (see step S122 in FIG. 11).

When the content of the requirement specification and the content of the sensor setting file are not consistent with each other, i.e., when these contents are different, the controller 5 may perform an error processing (see step S123 in FIG. 11). In an embodiment, the controller 5 may display an error indication on the display device.

Figure 13:
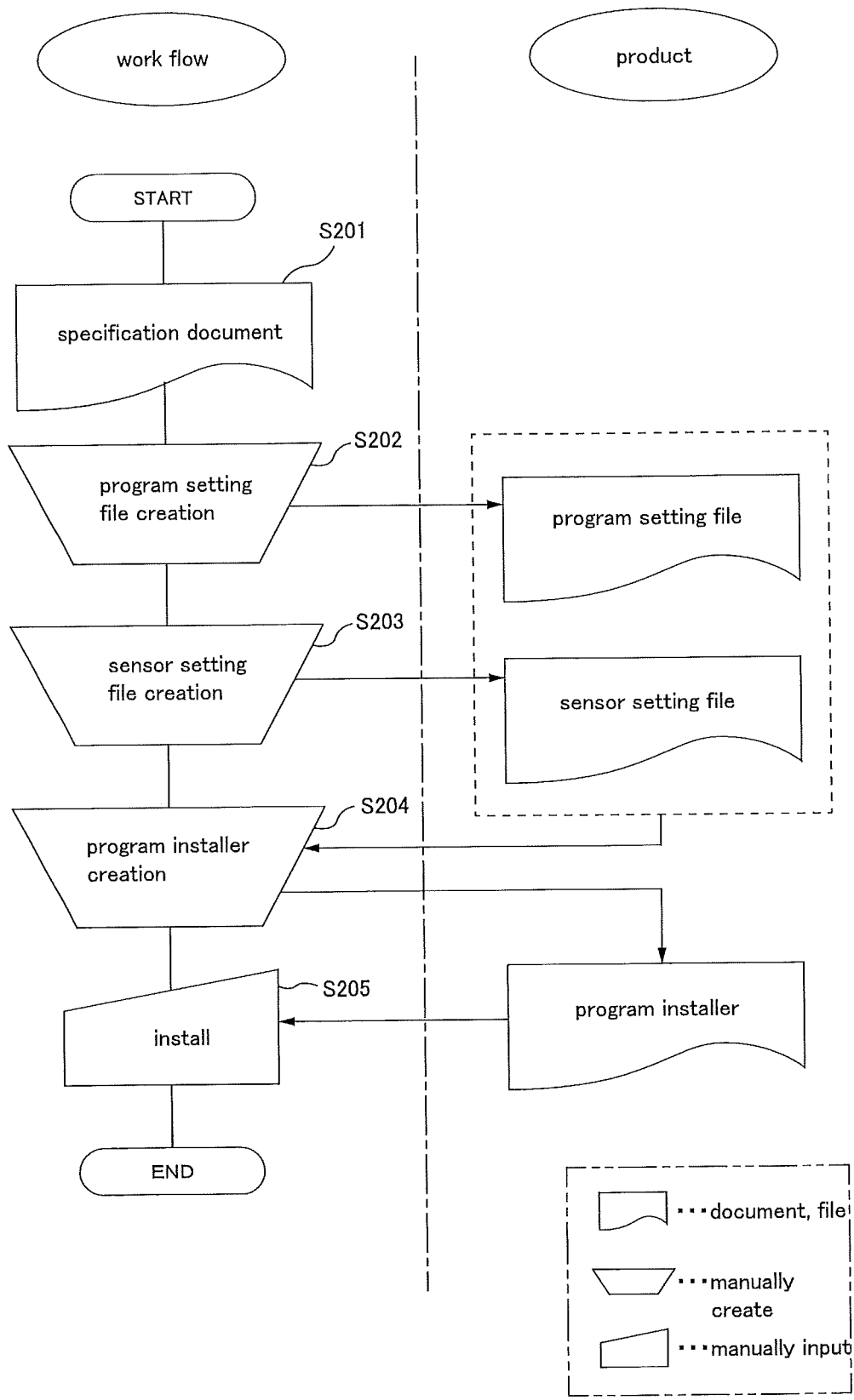
FIG. 13 is a view showing a flow for determining a specification of a polishing unit based on a specification document.

Effects of the embodiment will be described while comparing with a comparative example. As shown in FIG. 13 as the comparative example, the sensor setting file must be created manually based on the requirement specification from the user (see step S203 in FIG. 13). In this manner, the specification of the semiconductor manufacturing apparatus is manually determined based on the specification document received from the user. Therefore, it takes time and effort, and human error may occur.

According to the embodiment, the sensor corresponding to the processing unit is automatically determined based on the operation of the processing unit, and the sensor setting file is automatically created. In this manner, a device specification of the semiconductor manufacturing apparatus is automatically determined so as to conform to the requirement specification from the user.

The controller 5 confirms the consistency between the content of the requirement specification required by the user and the content of the sensor setting file, and introduces the program into the memory only when the requirement specification and the device specification are consistent with each other. Therefore, it is possible to improve the efficiency of a work with respect to the design of the semiconductor manufacturing apparatus, and there is no possibility that the human error will occur. Furthermore, according to the embodiment, it is possible to shorten an operation time, and further it is possible to reduce the number of clean papers used in a clean room.

In the above-described embodiment, the sensors 370 provided in the polishing units 3A to 3D have been described. However, the design method of the semiconductor manufacturing apparatus according to the embodiment can also be applied to a sensor provided in another processing unit. For example, the controller 5 may operate the transfer robot 22 of the load/unload unit 2 to specify the sensor 270 corresponding to the load/unload unit 2. The controller 5 may operate the cleaning module of the cleaning unit 4 to specify the sensor 470 corresponding to the cleaning unit 4.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

What is claimed is:

1. A design method of a semiconductor manufacturing apparatus comprising:
    creating a program setting file storing setting information of a program necessary for executing a process with respect to the semiconductor manufacturing apparatus based on a requirement specification from a user;
    creating a program installer for introducing the program into a controller of the semiconductor manufacturing apparatus from the program setting file;
    operating a processing unit of the semiconductor manufacturing apparatus;
    specifying a sensor corresponding to the processing unit based on the operation of the processing unit;
    creating a sensor setting file storing information obtained by specifying the sensor;
    comparing a content of the requirement specification and a content of the sensor setting file to confirm a consistency between the content of the requirement specification and the content of the sensor setting file; and
    introducing the program into a memory of the controller by the program installer when the content of the requirement specification and the content of the sensor setting file are consistent with each other,
    wherein specifying the sensor comprises:
        rotating a plurality of polishing tables at different rotational speeds, in a state of connecting a table torque sensor to at least one of the polishing tables in the processing unit;
        confirming the presence or absence of output of the sensor data of the table torque sensor; and
        determining whether or not the table torque sensor is connected to each of the polishing tables based on the presence or absence of output of the sensor data.

2. The method according to claim 1, wherein specifying the sensor comprises:
    specifying the table torque sensor corresponding to each of the polishing tables based on different sensor data of a plurality of table torque sensors output corresponding to the different rotational speeds when determining connections of the table torque sensors to the polishing tables.

3. A design method of a semiconductor manufacturing apparatus comprising:
    creating a program setting file storing setting information of a program necessary for executing a process with respect to the semiconductor manufacturing apparatus based on a requirement specification from a user;
    creating a program installer for introducing the program into a controller of the semiconductor manufacturing apparatus from the program setting file;
    operating a processing unit of the semiconductor manufacturing apparatus;
    specifying a sensor corresponding to the processing unit based on the operation of the processing unit;
    creating a sensor setting file storing information obtained by specifying the sensor;
    comparing a content of the requirement specification and a content of the sensor setting file to confirm a consistency between the content of the requirement specification and the content of the sensor setting file; and
    introducing the program into a memory of the controller by the program installer when the content of the requirement specification and the content of the sensor setting file are consistent with each other,
    wherein specifying the sensor comprises:
        rotating the polishing tables at different rotational speeds in a state of connecting a trigger sensor and a film thickness measurement sensor corresponding to the trigger sensor to at least one of the polishing tables in the processing unit;
        confirming the presence or absence of sensor data of the film thickness measurement sensor at a timing of a trigger signal output by the trigger sensor; and
        determining whether or not the film thickness measurement sensor is connected to each of the polishing tables based on the presence or absence of output of the sensor data.

4. The method according to claim 3, wherein specifying the sensor comprises:
    specifying the film thickness measurement sensor corresponding to each of the polishing tables based on the sensor data of the film thickness measurement sensor at different timings of trigger signals when specifying connection of film thickness measurement sensors to the polishing tables.

5. A non-transitory computer-readable storage medium storing a program of causing a computer to execute a design method of a semiconductor manufacturing apparatus, the program causing the computer to perform operations of:
    creating a program setting file storing setting information of a program necessary for executing a process with respect to the semiconductor manufacturing apparatus based on a requirement specification from a user;
    creating a program installer for introducing the program necessary for executing the process into a controller of the semiconductor manufacturing apparatus from the program setting file;
    operating a processing unit of the semiconductor manufacturing apparatus;
    specifying a sensor corresponding to the processing unit based on the operation of the processing unit;
    creating a sensor setting file storing information obtained by specifying the sensor;
    comparing a content of the requirement specification and a content of the sensor setting file to confirm a consistency between the content of the requirement specification and the content of the sensor setting file; and
    introducing the program necessary for executing the process into a memory of the controller by the program installer when the content of the requirement specification and the content of the sensor setting file are consistent with each other, wherein causing the computer to perform the operations comprises causing the computer to perform operations of:

rotating a plurality of polishing tables at different rotational speeds, in a state of connecting a table torque sensor to at least one of the polishing tables in the processing unit;

confirming the presence or absence of output of the sensor data of the table torque sensor; and determining whether or not the table torque sensor is connected to each of the polishing tables based on the presence or absence of output of the sensor data.

6. The storage medium according to claim 5, wherein causing the computer to perform the operations comprises causing the computer to perform operations of:

specifying the table torque sensor corresponding to each of the polishing tables based on different sensor data of a plurality of table torque sensors output according to the different rotational speeds when determining connections of the table torque sensors to the polishing tables.

7. A non-transitory computer-readable storage medium storing a program of causing a computer to execute a design method of a semiconductor manufacturing apparatus, the program causing the computer to perform operations of:

creating a program setting file storing setting information of a program necessary for executing a process with respect to the semiconductor manufacturing apparatus based on a requirement specification from a user;

creating a program installer for introducing the program necessary for executing the process into a controller of the semiconductor manufacturing apparatus from the program setting file;

operating a processing unit of the semiconductor manufacturing apparatus;

specifying a sensor corresponding to the processing unit based on the operation of the processing unit;

creating a sensor setting file storing information obtained by specifying the sensor;

comparing a content of the requirement specification and a content of the sensor setting file to confirm a consistency between the content of the requirement specification and the content of the sensor setting file; and introducing the program necessary for executing the process into a memory of the controller by the program installer when the content of the requirement specification and the content of the sensor setting file are consistent with each other, wherein causing the computer to perform the operations comprises causing the computer to perform operations of:

rotating the polishing tables at different rotational speeds, respectively, in a state of connecting a trigger sensor and a film thickness measurement sensor corresponding to the trigger sensor to at least one of the polishing tables in the processing unit;

confirming the presence or absence of sensor data of the film thickness measurement sensor at a timing of a trigger signal output by the trigger sensor; and determining whether or not the film thickness measurement sensor is connected to each of the polishing tables based on the presence or absence of output of the sensor data.

8. The storage medium according to claim 7, wherein causing the computer to perform the operations comprises causing the computer to perform operations of:

specifying the film thickness measurement sensor corresponding to each of the polishing tables based on the sensor data of the film thickness measurement sensor at different timings of trigger signals when specifying the connections of film thickness measurement sensors to the polishing tables.

* * * * *